(12) United States Patent
Fast (10) Patent No.: US 9,512,675 B1
(45) Date of Patent: Dec. 6, 2016

(54) LEVELING HUNTING LADDER

(71) Applicant: Curtis D. Fast, Mountain Lake, MN (US)

(72) Inventor: Curtis D. Fast, Mountain Lake, MN (US)

( * ) Notice: Subject to any disclaimer, the term of this patent is extended or adjusted under 35 U.S.C. 154(b) by 0 days.

(21) Appl. No.: 14/729,045

(22) Filed: Jun. 2, 2015

Related U.S. Application Data (60) Provisional application No. 61/997,435, filed on Jun. 2, 2014.

(51) Int. Cl.
| | |
|---|---|
| *E06C 1/34* | (2006.01) |
| *E06C 1/38* | (2006.01) |
| *E06C 1/08* | (2006.01) |
| *E06C 1/04* | (2006.01) |
| *A01M 31/02* | (2006.01) |

(52) U.S. Cl.
CPC ............... *E06C 1/34* (2013.01); *A01M 31/02* (2013.01); *E06C 1/04* (2013.01); *E06C 1/08* (2013.01); *E06C 1/38* (2013.01)

(58) Field of Classification Search
CPC ............ A01M 31/02; E06C 1/04; E06C 1/08; E06C 1/10; E06C 1/38; E06C 1/52; E06C 1/56; E06C 7/48; E06C 7/428; E06C 1/34; E06C 1/383
See application file for complete search history.

(56) References Cited

U.S. PATENT DOCUMENTS

| | | | |
|---|---|---|---|
| 112,276 A | 2/1871 | Peregoy | |
| 143,112 A | 9/1873 | Ainsworth | |
| 191,181 A | 5/1877 | Row | |
| 317,534 A | 5/1885 | Hoell | |
| 886,605 A | 5/1908 | Hersche | |
| 1,837,585 A | 12/1931 | Redinbaugh | |
| 2,232,414 A | 2/1941 | Swann | |
| 2,316,560 A | 4/1943 | Causey | |
| 3,116,808 A | 1/1964 | Riley | |
| 3,294,196 A | 12/1966 | Rabelos | |
| 3,961,686 A | 6/1976 | Starkey | |
| 3,995,714 A * | 12/1976 | Brookes et al. ............. | 182/100 |
| 4,090,587 A * | 5/1978 | Pyle ............................. | 182/206 |
| 4,411,335 A | 10/1983 | Forrester | |
| 4,884,659 A * | 12/1989 | Chao ............................ | 182/164 |
| 5,016,732 A | 5/1991 | Dunn | |
| 5,040,635 A * | 8/1991 | Strickland ..................... | 182/100 |
| 5,439,072 A * | 8/1995 | Jenkins, Jr. .................. | 182/100 |
| 5,509,499 A | 4/1996 | Prejean | |

(Continued)

*Primary Examiner* — Colleen M Chavchavadze
(74) *Attorney, Agent, or Firm* — Albert W. Watkins (57) ABSTRACT

Ladder modules are provided in manageable length sections. The first section is secured at the top with a multi-hole horizontal mounting bar that is secured by a ratchet strap with hooks. The bottom of the first section rests firmly on the ground with a cleat at the bottom to secure the ladder section and prevent shifting. The second section contains a ball on the bottom of the structure that is mounted onto the first section by placing the ball into the receiving end of the first section, which allows the second section to pivot 360 degrees and lean and tilt fore and aft. This section is also secured to the tree with a ratchet strap and hooks, and is safe to climb to the next section after tightening the ratchet strap. Additional sections can be added in the same manner as the second section to pivot and level as needed.

8 Claims, 7 Drawing Sheets

(56) References Cited

U.S. PATENT DOCUMENTS

| | | | |
|---|---|---|---|
| 5,704,448 A | | 1/1998 | Jenkins |
| 5,711,399 A | | 1/1998 | Wayne-Prejean |
| 5,816,362 A | | 10/1998 | Jenkins |
| 5,860,490 A | | 1/1999 | Petti et al. |
| 6,006,864 A | | 12/1999 | Musk |
| 6,073,725 A | | 6/2000 | Kumher et al. |
| 6,079,072 A | * | 6/2000 | Katsiri ............... 14/2.4 |
| 6,138,792 A | | 10/2000 | Morris |
| 6,318,498 B1 | * | 11/2001 | Warner ............ 182/164 |
| 6,340,071 B1 | | 1/2002 | Diekemper |
| 6,547,035 B1 | * | 4/2003 | D'Acquisto ......... 182/100 |
| 6,668,975 B2 | | 12/2003 | Skipper |
| 6,857,503 B2 | | 2/2005 | Simpson et al. |
| 6,883,464 B2 | * | 4/2005 | Kirch .............. 119/706 |
| 7,134,525 B1 | * | 11/2006 | Ferris ............. 182/107 |
| 7,163,082 B2 | * | 1/2007 | Bigard ............ 182/100 |
| 7,237,649 B2 | | 7/2007 | Harmston |
| D590,068 S | | 4/2009 | Woller |
| 7,717,232 B2 | | 5/2010 | Butcher |
| 7,909,139 B2 | * | 3/2011 | Blue ............ A01M 31/02 |
| | | | 182/103 |
| 8,424,639 B1 | | 4/2013 | Davis |
| 8,443,938 B2 | | 5/2013 | Furseth et al. |
| 8,528,695 B1 | * | 9/2013 | Orpia ............ 182/107 |
| 8,651,259 B1 | | 2/2014 | Blehm |
| 8,695,762 B1 | | 4/2014 | Carter et al. |
| 2013/0025969 A1 | * | 1/2013 | Horn ............... 182/8 |
| 2013/0037351 A1 | * | 2/2013 | Gallup et al. ......... 182/129 |
| 2013/0043092 A1 | * | 2/2013 | Clardy ............ 182/19 |
| 2014/0027204 A1 | * | 1/2014 | Niemela .......... 182/129 |
| 2014/0166397 A1 | * | 6/2014 | Reynolds ......... 182/107 |
| 2015/0060201 A1 | | 3/2015 | Hume |
| 2015/0060204 A1 | * | 3/2015 | Walter et al. ......... 182/163 |

* cited by examiner

LEVELING HUNTING LADDER

CROSS REFERENCE TO RELATED APPLICATIONS

The present application claims the benefit of U.S. provisional patent application 61/997,435 filed Jun. 2, 2014 of like inventorship, the teachings and entire contents which are incorporated herein by reference.

BACKGROUND OF THE INVENTION

1. Field of the Invention

The present invention pertains generally to ladders, and more particularly to hunting ladders. In one preferred manifestation, the present invention is a 360 degree pivoting leveling ladder system that provides a substantially level ladder regardless of the orientation of the structure the ladder is mounted onto.

2. Description of the Related Art

Ladders provide a series of spaced bars or rungs that can easily be traversed. These rungs act as lightweight steps that facilitate moving up and down surfaces that are too steep to safely or conveniently traverse. Conventional ladders are designed for leaning on upstanding members such as trees, poles, and other generally vertically oriented structures. In many instances, the vertical distance being traversed is greater than would be convenient for a single section rigid ladder, which must be stored when not in use and transported to and from storage.

Recognizing this limitation and providing a solution, a number of US patents illustrate multiple ladder sections that are coupled end-to-end. These patents, the teachings and contents which are incorporated herein by reference, include: U.S. Pat. No. 3,995,714 by Brookes et al, entitled "Multi-section ladder for scaling poles"; U.S. Pat. No. 4,411,335 by Forrester, entitled "Hunter's tree stand"; U.S. Pat. No. 5,016,732 by Dunn, entitled "Portable combination hunting and observation stand"; U.S. Pat. No. 5,040,635 by Strickland, entitled "Multisection pole ladder"; U.S. Pat. No. 6,668,975 by Skipper, entitled "Modular ladder with removable rungs"; U.S. Pat. No. 7,717,232 by Butcher, entitled "Ladder stand with optional extension member, kit for constructing height-adjustable ladder stand, and method of using same"; U.S. Pat. No. 8,443,938 by Furseth et al, entitled "Hunting ladder stand having collapsible ladder segments"; U.S. Pat. No. 8,651,259 by Blehm, entitled "Ladder bridge apparatus"; U.S. Pat. No. 8,695,762 by Carter et al, entitled "Upright tree stand"; and Des 590,068 by Woller, entitled "Modular tree ladder".

These ladders work well when climbing up a surface such as a wall or other building component, and may readily be adapted for different vertical distances. Buildings are generally flat and vertical, and also generally have a flat surface at the base of the vertical face that the ladder can stand upon.

Unfortunately, in contrast to a building, most of the trees in the wild do not grow "plumb". Setting a conventional ladder in a crooked tree results in the ladder being slanted. This presents a serious hazard to a hunter using a ladder.

When the ladder is tilted, the rungs are also. Sloped rungs are more difficult for a person to safely and securely place their foot upon. In addition, when the conventional ladder is slanted, then the base of the ladder will not be standing flat on the ground. This increases the risk of the ladder shifting and pivoting when a person climbs up the ladder. The combination of sloped rungs and a wobbling base make the ladder extremely dangerous, and may lead to a serious fall. As a result, it is impossible to safely set a conventional ladder in many trees.

One prior art approach to overcome this limitation is to provide a ladder fabricated from a plurality of independent modules. Each module is then suspended independently, and a person climbing the ladder will move from one ladder module to the next. By suspending each module independently, the modules rely upon the vertical support for anchoring, rather than the base or ground. This can eliminate the wobble of the prior art conventional ladders. Exemplary US patents, the teachings and content which are incorporated herein by reference, include: U.S. Pat. No. 317,534 by Hoell, entitled "Fire escape"; U.S. Pat. No. 886,605 by Hersche, entitled "Combined window rest and escape ladder"; U.S. Pat. No. 2,232,414 by Swann, entitled "Ladder anchoring means"; U.S. Pat. No. 3,961,686 by Starkey, entitled "Easy-up tree stand"; U.S. Pat. No. 5,439,072 by Jenkins, entitled "Modular ladder system"; U.S. Pat. No. 5,509,499 by Prejean, entitled "Portable hunter's ladder"; U.S. Pat. No. 5,704,448 by Jenkins, entitled "Modular ladder system"; U.S. Pat. No. 5,711,399 by Wayne-Prejean, entitled "Portable hunter's ladder"; U.S. Pat. No. 5,816,362 by Jenkins, entitled "Modular safety ladder system"; U.S. Pat. No. 6,006,864 by Musk, entitled "Tree ladder attachment"; U.S. Pat. No. 6,547,035 by D'Acquisto, entitled "Ladder module"; and U.S. Pat. No. 7,237,649 by Harmston, entitled "Tree ladder". Unfortunately, for use upon a tree, these ladders also require anchoring to the tree at both the top and bottom of each module, making the installation more time consuming and difficult. If the installation is not secure within each ladder module, than an individual module may slip or rotate. Since the modules are independent of each other, this may render the ladder structure impassible.

A different approach to overcome the tilt of the tree is to run the ladder away from the tree and provide a pivotal ladder termination, such as illustrated in U.S. Pat. No. 8,528,695 by Orpia, entitled "Ladder safety systems". This approach allows a person to set a single ladder section against an irregular support such as a tree and upon an uneven ground surface, and angle the ladder termination to securely couple to the tree. This resolves the prior art problem with the wobbling base, but in turn limits the ladder to the single section, since there is no way to then add another section to the ladder to increase vertical climb. Two additional related pivotal terminations are illustrated in U.S. Pat. No. 6,073,725 by Kumher et al, entitled "Multi-position ladder and support therefor"; and 2015/0060201 by Hume, entitled "Self leveling step ladder with a universal hinge joint"; the teachings and contents which are also incorporated herein by reference.

U.S. Pat. No. 6,138,792 by Morris, entitled "Portable climbing apparatus", the teachings and contents which are incorporated herein by reference, discloses a flexible ladder with multiple sections and multiple straps. This patent offers much benefit over the prior art conventional ladders, by following less than perfectly flat and vertical surfaces, but is still limited to relatively straight trees.

Other exemplary prior art patents, the teachings and contents which are incorporated herein by reference, include: U.S. Pat. No. 143,112 by Ainsworth, entitled "Fire-escapes"; U.S. Pat. No. 191,181 by Row, entitled "Fire-escape"; U.S. Pat. No. 3,116,808 by Riley, entitled "Portable deer stand"; U.S. Pat. No. 3,294,196 by Rabelos, entitled "Emergency escape ladder and amusement device"; U.S. Pat. No. 5,860,490 by Petti et al, entitled "Monopole ladder"; and U.S. Pat. No. 6,340,071 by Diekemper, entitled "Rung-foldable ladder device".

In addition to the aforementioned patents, Webster's New Universal Unabridged Dictionary, Second Edition copyright 1983, is incorporated herein by reference in entirety for the definitions of words and terms used herein.

SUMMARY OF THE INVENTION

To obtain a level system, ladder modules are provided in sections of reasonably manageable length. The first section is secured at the top with a multi-hole horizontal mounting bar that is secured by a ratchet strap with hooks. The bottom of the first section rests firmly on the ground with a spike at the bottom to secure the ladder section and prevent shifting. The second section contains a ball joint on the bottom of the structure that is mounted onto the first section by placing the ball joint into the receiving end of the first section, which allows the second section to pivot 360 degrees and lean and tilt fore and aft. This allows the ladder to be positioned level and secure to the tree whose trunk or branch is not plumb with the first section. This section also mounts the same as the first with a ratchet strap and hooks. Each section is secured and safe to climb to the next section after tightening the ratchet strap. Another section can be added in the same manner as the second section to pivot and level as needed. The shape of the structure provides a rock solid ladder system that makes climbing into trees safer. The 360 degree pivoting feature of the invention makes this ladder a more useful ladder in the field with the ability to adapt to the configuration of upstanding members that slant back and sideways or fore and aft and still provide a level and secure climbing aid over the conventional ladder. There has thus been outlined, rather broadly, the more important feature of the invention in order that the detailed description thereof that follow may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception upon which this disclosure is based may readily be utilized as a basis for the design of other structures, methods, and systems for carrying out the several purposes of the present invention. It is important, therefore, that the claims be regarded as including such equivalent constructions insofar as they do not depart from the spirit and scope of the present invention.

In a first manifestation, the invention is a 360 degree pivoting leveling ladder system for mounting to an upstanding member such as a tree or limb and for ascending or descending a person to and from an elevated position with respect to a ground surface. The ladder system has rungs for climbing to attach the next 360 degree pivoting and leveling ladder system; a ladder base member for supporting assembly; and a ladder member mounted by said base assembly.

The 360 degree pivoting leveling ladder system can be oriented substantially independent of the orientation of the upstanding member.

OBJECTS OF THE INVENTION

Exemplary embodiments of the present invention solve inadequacies of the prior art by providing a new 360 degree system for providing substantially level rungs regardless of the orientation of the structure on which the ladder is mounted. The new leveling 360 degree system may be mounted on trees that deviate from a plumb orientation, have surface irregularities that would make prior ladders unstable, or place the prior art ladder at such a slope that the ladder is dangerous to stand on. The present invention makes available a much greater variety of ladder mounting locations.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a new 360 degree pivoting leveling ladder system apparatus and method in which has many of the advantages of the hunting ladders mentioned heretofore and many novel features that result in a new leveling ladder system which in not anticipated, rendered, obvious, suggested, or even implied by any of the prior art climbing ladders either alone or in any combination thereof. A second object of the invention is to provide a new 360 pivoting leveling ladder system that may be easily and efficiently manufactured and marketed. Another object of the present invention is to provide a new leveling 360 degree pivoting leveling ladder system that is durable and reliable construction. A further object of the invention is to provide a new 360 degree pivoting leveling ladder system that is susceptible of a low cost of manufacture with regard to both materials and labor, and that, accordingly, is then susceptible of low prices of sale to the consuming public, thereby making such 360 degree pivoting leveling ladder system economically available to the public. Yet another object of the present invention is to provide a new 360 degree pivoting leveling ladder system that provides in the apparatuses and methods of the prior art some of the advantages thereof, while simultaneously overcoming some of the disadvantages normally associated therewith.

These, together with other objects of the invention along with various features of novelty that characterize the invention, are pointed out with particularity in the claims annexed to and forming a part of this disclosure. For a better understanding of the invention, its advantages, and the specific objects attained by its uses, reference should be made to the illustrated preferred embodiments of the invention.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
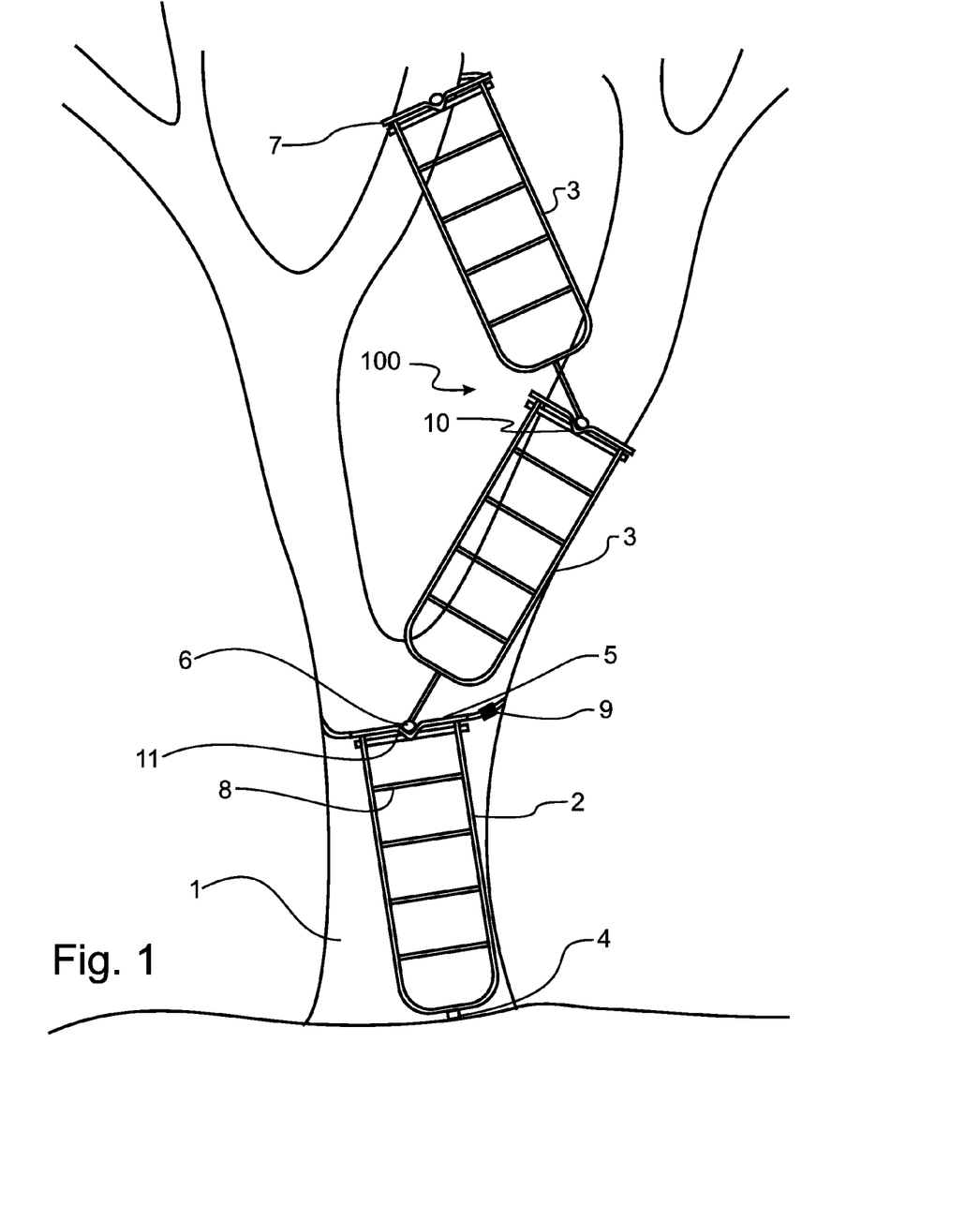
FIG. 1 illustrates a preferred embodiment 360 degree pivoting leveling ladder system designed in accord with the teachings of the present invention and mounted in an uneven tree, from a front elevational view.

With reference now to the drawings, and in particular to FIGS. 1 through 7 thereof, a preferred embodiment 360 degree pivoting leveling ladder system 100 embodying the principles and concepts of the present invention and generally designated by the reference numerals in FIG. 1 will be described.

As best illustrated in FIGS. 1 through 7, preferred embodiment 360 degree pivoting leveling ladder system 100 is highly effective for mounting on an upstanding member 1 such as a tree trunk or limb for aiding a person climbing the upstanding member at an elevated position with respect to the ground surface. Preferred embodiment 360 degree pivoting leveling ladder system 100 as illustrated in FIG. 1 generally comprises a base assembly 2 and mid and upper assemblies 3, though it will be understood that any number of mid and upper assemblies 3 may be provided, and that these mid and upper assemblies 3 therefore comprise modules that may be added or removed at will from preferred embodiment 360 degree pivoting leveling ladder system 100.

The base assembly 2 is the first section of preferred embodiment 360 degree pivoting leveling ladder system 100. Base assembly 2 operatively rests firmly on the ground, and is provided with a stabilizer cleat 4 that is used to engage the ground and in turn to stabilize base assembly 2. Stabilizer cleat 4 may comprise any suitable ground engaging apparatus, but in the preferred embodiment is a small U- or V-shaped strap that provides a localized force to engage the ground. Ground piercing apparatus may alternatively be used, but such apparatus tend to be sharp and somewhat more hazardous to transport and use.

A ratchet strap 9 wraps around upstanding member 1 and is attached to the lateral base assembly 7 using hooks as are commonly used to terminate the straps. The tree or limb may either be slanted sideways or fore and aft.

Figure 2:
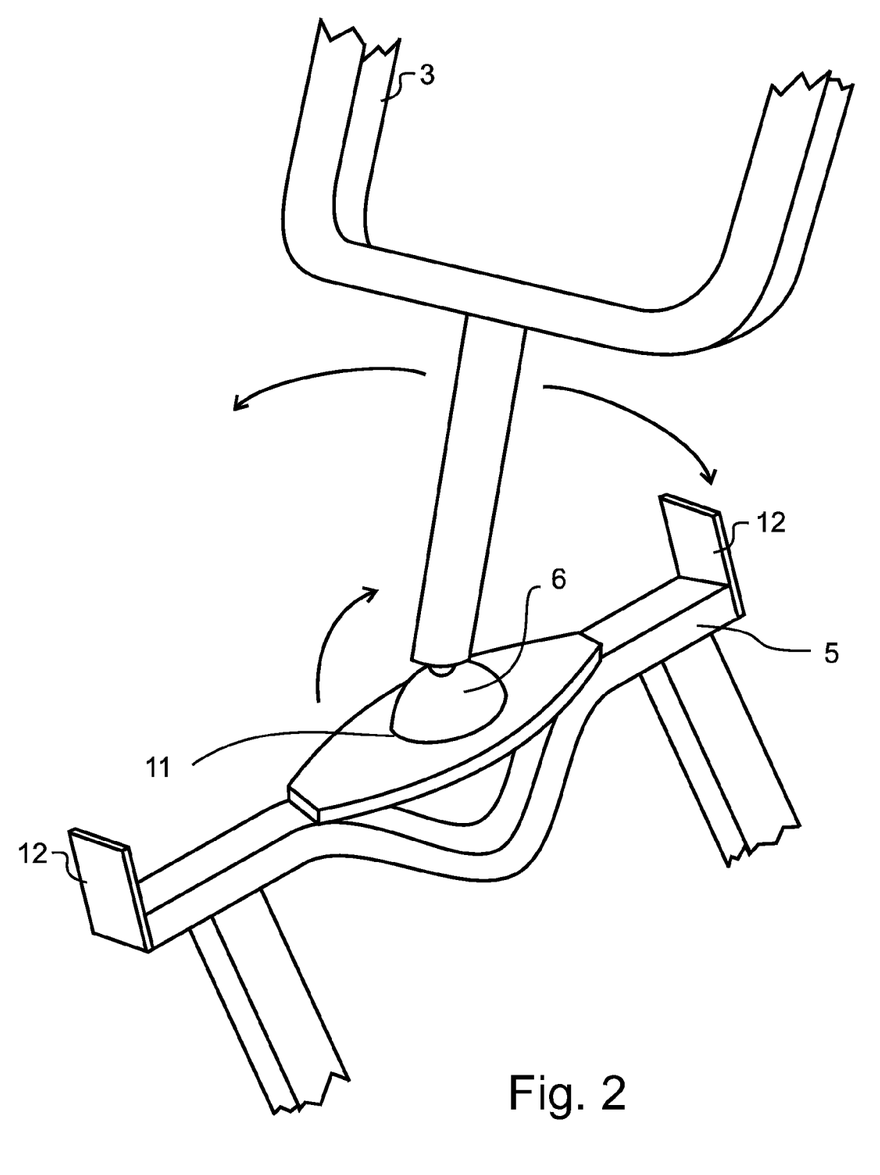
FIG. 2 illustrates a preferred embodiment connection between the upper section and the lower section as used in the preferred embodiment 360 degree pivoting leveling ladder system of FIG. 1 from an enlarged and projected partial view, showing the capability of the connection to rotate 360 degrees and tilt in any direction.

Once base assembly 2 is secured to the ground and to upstanding member 1, mid-section assembly 3 will be attached to the 360 degree pivot mounting hole 11 with the 360 degree pivoting ball 6, the combination which are illustrated in enlarged view in FIG. 2. Assembly 3 can be adjusted to the tree 1 by pivoting and tilting to the desired position by leaning the lateral base assembly 7 against either a slanted or fore and aft tree 1. Securing with a ratchet strap 9 with hooks will provide a solid and secure climb with level steps 8.

One can then climb on top of the mid-section assembly 5 and repeat the process of mounting more assemblies 3 until the desired height is reached. To provide a safer platform, tabs 12 are provided. These tabs 12 will help to prevent a shoe from accidentally sliding off left or right from mid-section assembly 5.

Figure 3:
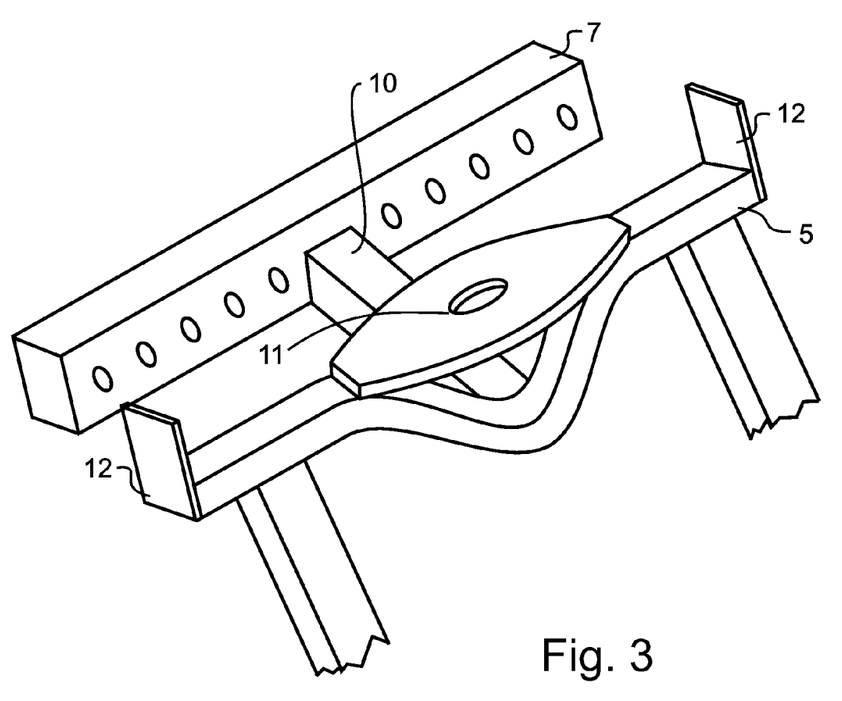
FIG. 3 illustrates a preferred embodiment upper portion of a ladder section such as may be used in the preferred embodiment 360 degree pivoting leveling ladder system of FIG. 1 from an enlarged and projected partial view with a 360 degree pivoting mounting hole similar to that of FIG. 2, but with an additional spacer bar to allow the ladder to pivot 360 degrees, and an extreme mounting tube.
Figure 4:
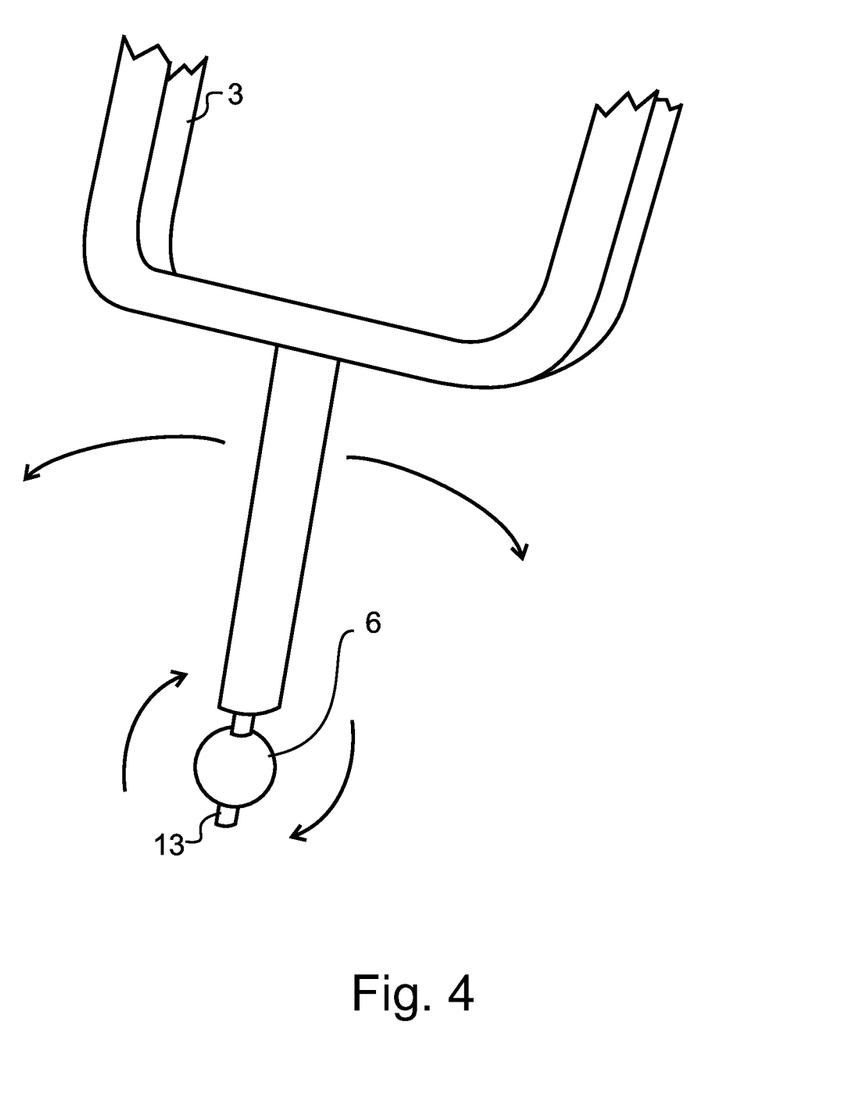
FIG. 4 illustrates the lower portion of the 360 degree pivot ball connector of FIG. 2, allowing the ladder section to pivot 360 degrees and tilt to the desired level.

Spacer 10, best illustrated in FIG. 3, may in one embodiment be of a fixed length. In this fixed length embodiment, spacer 10 will be of sufficient length to allow individual assemblies 2, 3 to rotate 360 degrees without coming into contact with the tree 1.

Figure 6:
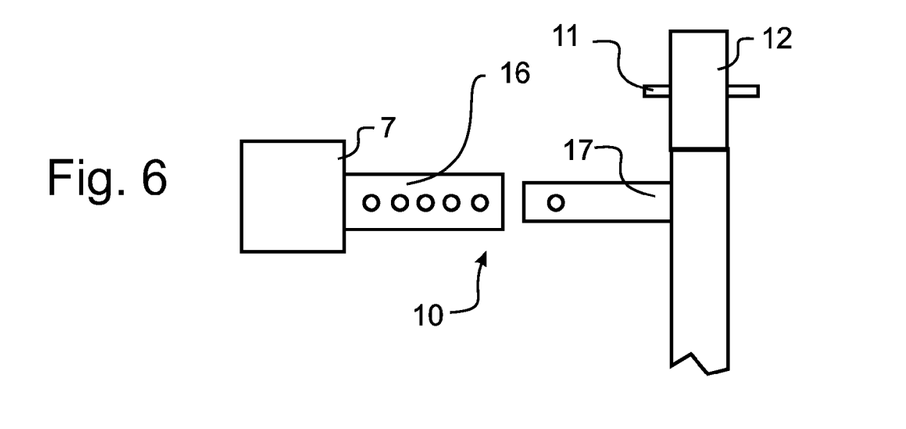
FIG. 6 illustrates the preferred embodiment upper portion of a ladder section of FIG. 3 from a side elevational partial view, but with the spacer bar in an adjustable state.
Figure 7:
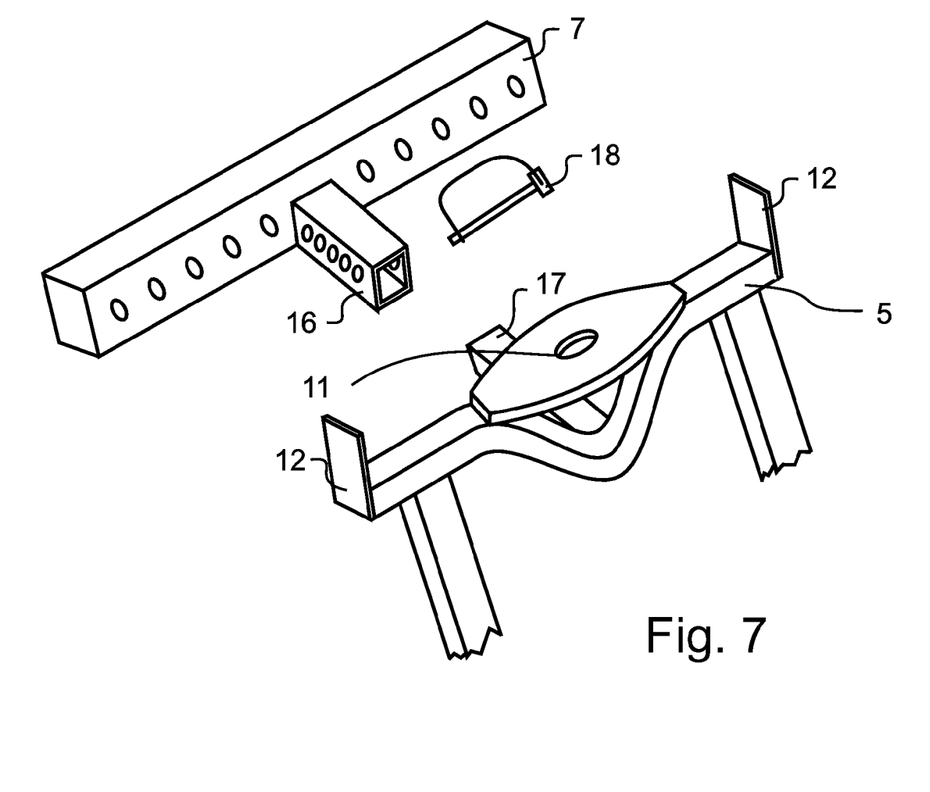
FIG. 7 illustrates the preferred embodiment upper portion of a ladder section of FIG. 6 from a projected partial view.

In another embodiment illustrated in FIGS. 6 and 7, spacer 10 is adjustable in length. A pair of tubular members 16, 17 are capable of slidably coupling together, and may be fixed in relative position using a fastener such as pin 18 illustrated in FIG. 7. When fixed, the pair of tubular members 16, 17 form an adjustable spacer 10. In this embodiment, spacer 10 may be used to adjustably control the tilt of each ladder assembly 2, 3, to compensate for the angle of the tree and allow each assembly 2, 3 to remain properly oriented to keep the steps 8 from sloping to a difficult position to tread upon. To be clear, and as is very evident in FIG. 1, the assemblies 2, 3 may lean to the left or right, which does create a left-to-right tilt of steps 8 that cannot be eliminated. However, as is known in the art of ladders, each step or rung from the front to back will also preferably be as nearly level or parallel to the ground as possible. In other words, and taken to an extreme to illustrate, if preferred embodiment 360 degree pivoting leveling ladder system 100 is laid flat on the ground, only the edge of the steps 8 will be available to step on. If instead the ladder is vertical, then each step 8 may be parallel to the ground, presuming this was the orientation at the time of manufacture. This parallel to the ground in a direction of front-to-back makes the steps 8 easier to traverse. In this adjustable embodiment, spacer 10 will also preferably be adjustable to allow individual assemblies 2, 3 to rotate 360 degrees without coming into contact with the tree 1, just as in the fixed length embodiment.

As a safety feature to better ensure that adjacent assemblies 2, 3 remain coupled together, a bottom tail 13 preferably extends from 360 degree pivoting ball 6 by a short distance. As is evident from the Figures, mid-section assembly 5 has a central V-shape that provides space for tail 13 to pivot without interference.

Figure 5:
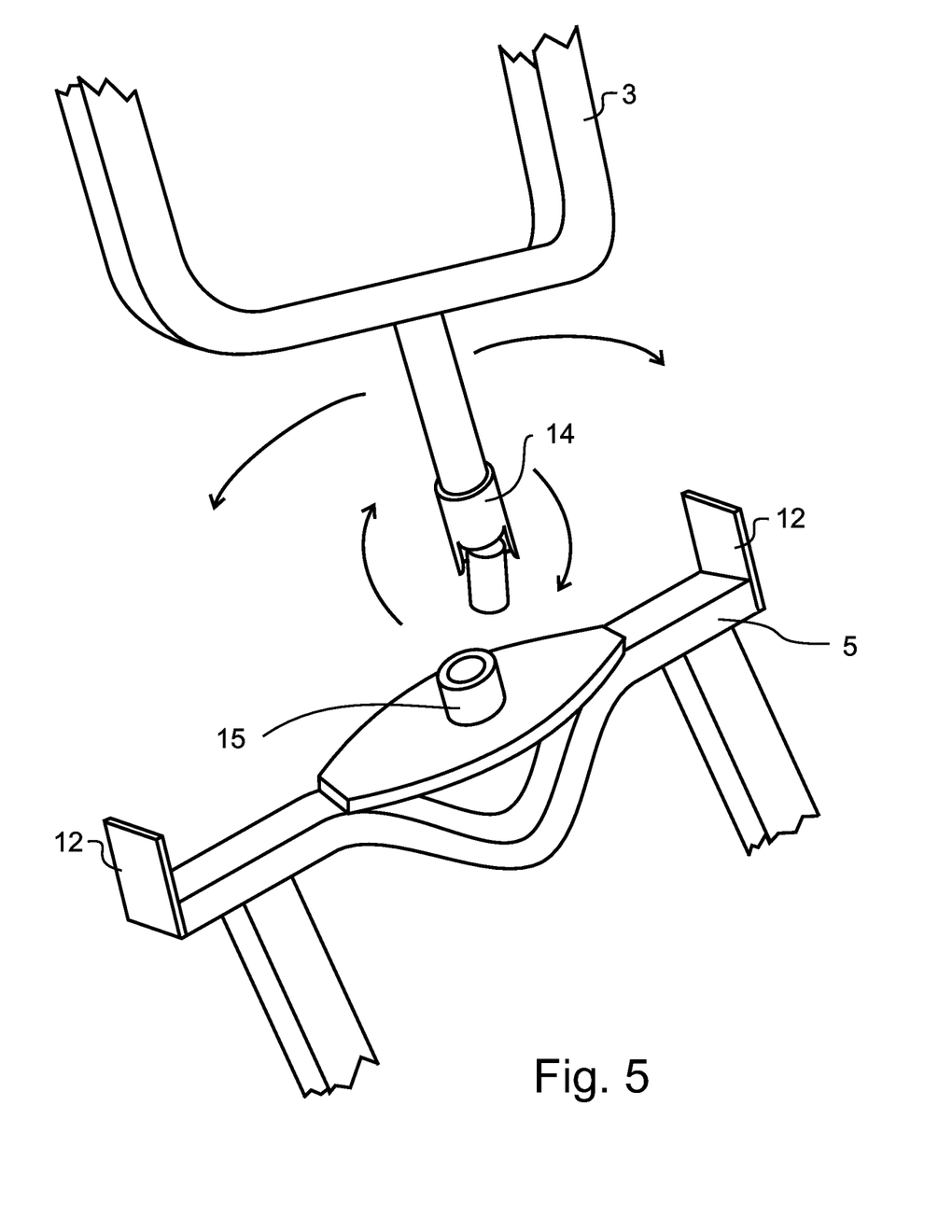
FIG. 5 illustrates an alternative embodiment 360 degree pivot and tilt connector incorporating a knuckle or universal joint.

FIG. 5 illustrates an alternative embodiment 360 degree pivot and tilt connector incorporating a knuckle or universal joint 14 that engages with a tubular receiver 15. Knuckle 14 in combination with tubular receiver 15 will provide the same or similar degrees of freedom as ball 6, but illustrate that any suitable joint that provides separability and freedom of rotation will be considered herein as known alternative embodiments.

Preferred embodiment 360 degree pivoting leveling ladder system 100 and preferred embodiment 360 degree pivoting leveling ladder system 200 illustrate different embodiments of apparatus designed in accord with the present invention. The embodiments are distinguished by the hundreds digit, and various components within each embodiment designated by the ones and tens digits. However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

Figures 8, 9:
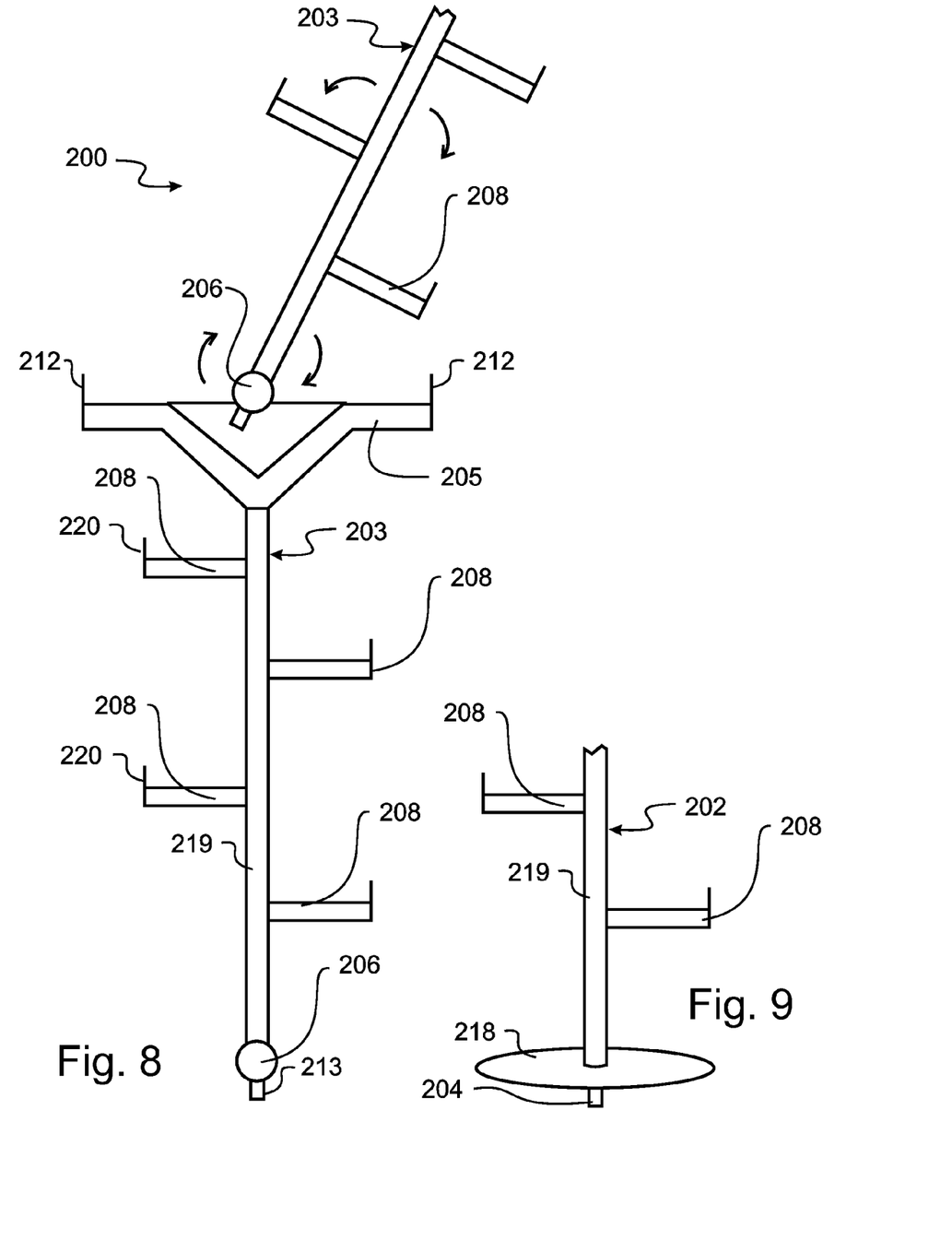
FIG. 8 illustrates an alternative embodiment 360 degree ladder incorporating a plurality of single pole ladder modules from a front elevational view.
FIG. 9 illustrates a lower portion of a bottom section ladder module used in the alternative embodiment 360 degree ladder of FIG. 8 from a front elevational view.

FIGS. 8 and 9 illustrate the alternative embodiment 360 degree ladder system 200 incorporating a plurality of single pole ladder modules 202, 203, with ladder module 202 serving as the ground-engaging base and ladder module 203 forming the repeatable mid and upper assemblies. Each module 202, 203 includes steps 208 extending transversely to the mono-pole 219 to allow a person to easily step thereon. Each step 208 also preferably includes a stop 220 which, in combination with mono-pole 219, captures the person's foot and prevents left-to-right movement, as viewed in FIGS. 8 and 9.

Since a mono-pole is used, a ground engaging disk 218 illustrated in FIG. 9 or other equivalent thereto may also be provided, if so desired, to provide additional stability with the earth.

As described, a 360 degree pivoting leveling ladder system designed in accord with the teachings of the present invention allows quick and easy climbing in trees that are less than desirable providing a safer way to climb trees for the hunter or persons needing to climb trees for work or pleasure.

As to a further discussion of the manner of usage and operation of the present invention, the same should be apparent from the above description. Accordingly, no further discussion to the manner of usage and operation will be provided.

With respect to the above description then, it is realized that the optimum dimensional relationship for the parts of the invention to include variations in size, materials, shape, form, function, manner of operation, assembly and use are deemed readily apparent and obvious to one skilled in the art and all equivalent relationships to those illustrated in the drawings and described in the specifications are intended to be encompassed by the present invention.

Therefore, the foregoing is considered as illustrative only of the principals of the invention. In view of the foregoing, it will be appreciated that one may utilize the foregoing teachings and make virtually an endless variety of modifications on the materials, locking and fastening structures, cosmetic features, details of construction, design of the components, and structures for fastening the ladder to an upstanding member. Further, since numerous modifications and changes will readily occur to those skilled in the art, it is not desired to limit the invention to the exact construction and operation shown and described. Accordingly, all suitable modifications and equivalents may be restored to fall within the scope of the invention.

I claim:

1. A leveling hunting ladder, comprising:
a base assembly having:
a ground engaging stabilizer cleat;
a plurality of base assembly steps progressively elevated with respect to said ground engaging stabilizer cleat; and
a pivot mounting hole distal to said ground engaging stabilizer cleat and separated therefrom by said plurality of base assembly steps;
an upper assembly having:
a pivoting ball engaged with said pivot mounting hole and configured to rotate through a full circle about a first axis, and to additionally tilt said first axis relative to said pivot mounting hole;
a plurality of upper assembly steps progressively elevated with respect to said pivoting ball; and
a bottom tail protruding from said pivoting ball distally to said plurality of upper assembly steps and positioned on an opposite side of said pivot mounting hole relative to said plurality of upper assembly steps.

2. The leveling hunting ladder of claim 1, further comprising a mid-section assembly having:
a first end and a second end, said mid-section assembly longitudinally extensive between said first and second ends along an axis generally parallel to a longitudinal axis of said plurality of base assembly steps, said mid-section assembly supporting said pivot mounting hole between said first and second ends; and
a central V-shape configured to provide space for said tail to pivot without interference with said mid-section assembly.

3. The leveling hunting ladder of claim 1, further comprising:
a mid-section assembly having a first end and a second end and longitudinally extensive between said first and second ends along an axis generally parallel to a longitudinal axis of said plurality of base assembly steps, and supporting said pivot mounting hole between said first and second ends;
a first tab extending transversely in a generally upward direction from said mid-section assembly adjacent said first end of said mid-section assembly; and
a second tab extending transversely in a generally upward direction from said mid-section assembly adjacent said second end of said mid-section assembly.

4. The leveling hunting ladder of claim 1, wherein said ground engaging stabilizer cleat further comprises a small strap configured to operatively provide a localized force to engage the ground.

5. The leveling hunting ladder of claim 1, wherein said base assembly further comprises an adjustable strap configured to operatively wrap around and thereby secure said base assembly to an upstanding member.

6. The leveling hunting ladder of claim 5, wherein said base assembly further comprises:
a lateral assembly, said adjustable strap attached at distal ends to said lateral assembly; and
a spacer extending transversely from said mid-section assembly to said lateral assembly.

7. The leveling hunting ladder of claim 6, wherein said spacer is adjustable in length.

8. The leveling hunting ladder of claim 7, wherein said spacer further comprises:
a pair of tubular members configured to slidably couple together; and
a fastener fixing said pair of tubular members in relative position.

* * * * *